(12) United States Patent
Stempnik et al.

(10) Patent No.: US 8,234,049 B2
(45) Date of Patent: Jul. 31, 2012

(54) ECM SECURITY STRATEGY FOR RATIONALIZING AND CONTROLLING INCREASING TRANSMISSION TORQUE REQUESTS ABOVE DRIVER COMMAND

(75) Inventors: Joseph M. Stempnik, Warren, MI (US); Richard B. Jess, Haslett, MI (US); Bahram Younessi, Farmington, MI (US); Mark H. Costin, Bloomfield Township, MI (US); Michael L. Kociba, Hartland, MI (US); Paul A. Bauerle, Fenton, MI (US); Bryan D. Lehman, Fenton, MI (US); William R. Mayhew, Ann Arbor, MI (US); Andrew W. Baur, Waterford, MI (US)

(73) Assignee: GM Global Technology Operations LLC

( * ) Notice: Subject to any disclaimer, the term of this patent is extended or adjusted under 35 U.S.C. 154(b) by 607 days.

(21) Appl. No.: 12/362,761

(22) Filed: Jan. 30, 2009

(65) Prior Publication Data
US 2009/0234545 A1    Sep. 17, 2009

Related U.S. Application Data

(60) Provisional application No. 61/036,576, filed on Mar. 14, 2008.

(51) Int. Cl.
*F02D 41/02* (2006.01)
*G06F 17/00* (2006.01)

(52) U.S. Cl. ............ 701/54; 701/85; 701/103; 123/376

(58) Field of Classification Search ............ 701/85, 701/84, 103; 477/107, 110, 115; 123/337, 123/339.23, 376, 406.52, 472
See application file for complete search history.

(56) References Cited

U.S. PATENT DOCUMENTS

| | | | | |
|---|---|---|---|---|
| 6,499,462 | B1 * | 12/2002 | Pursifull | 123/396 |
| 6,513,492 | B1 * | 2/2003 | Bauerle et al. | 123/396 |
| 6,704,638 | B2 | 3/2004 | Livshiz et al. | |
| 7,305,295 | B2 * | 12/2007 | Bauerle et al. | 701/93 |
| 7,500,467 | B2 * | 3/2009 | Hanamura | 123/399 |
| 2006/0213461 | A1 * | 9/2006 | Hayami | 123/41.15 |
| 2007/0066443 | A1 * | 3/2007 | Matsudaira et al. | 477/115 |
| 2007/0221167 | A1 * | 9/2007 | Costin et al. | 123/336 |
| 2009/0005943 | A1 * | 1/2009 | Oshima et al. | 701/62 |
| 2009/0018733 | A1 * | 1/2009 | Livshiz et al. | 701/54 |
| 2009/0088946 | A1 * | 4/2009 | Bauerle et al. | 701/103 |
| 2009/0319137 | A1 * | 12/2009 | Miyanoo | 701/54 |

FOREIGN PATENT DOCUMENTS

JP    2008-4547 A    2/2008

OTHER PUBLICATIONS

Kim et al., Performance of integrated engine-CVT control considering powertrain loss and CVT response lag, 2002, IMechE, vol. 216, Part D:J, pp. 545-553.*

(Continued)

*Primary Examiner* — Thomas G. Black
*Assistant Examiner* — Sara Lewandroski

(57) ABSTRACT

A control module includes a predicted torque control module that determines a desired throttle area based on a transmission torque request and a desired predicted torque. A throttle security module determines a throttle limit based on the desired throttle area and the desired predicted torque and determines an adjusted desired throttle area based on the throttle limit. A throttle actuator module adjusts a throttle based on the adjusted desired throttle area.

20 Claims, 11 Drawing Sheets

OTHER PUBLICATIONS

Kim et al., Control of Integrated Powertrain with Electronic Throttle and Automatic Transmission, May 2007, IEEE, vol. 15, No. 3, pp. 474-482.*

Luo et al., An integrated Diagnostic Development Process for Automotive Engine Control Systems, Nov. 2007, IEEE, vol. 37, No. 6, pp. 1163-1173.*

Griffiths, Embedded Software Control Design for an ELectronic Throttle Body, 2002, University of California, Berkeley, pp. 1-104.*

McKay et al., Delphi Electronic Throttle Control Systems for Model Year 2000, 2000, Delphi Automotive Systems, 2000-01-0556 SAE technical paper series, pp. 1-11.*

Kim et al., "Control of Integrated Powertrain with Electronic Throttle and Automatic Transmission," May 2007, IEEE, vol. 15, No. 3.*

U.S. Appl. No. 11/656,929, filed Jan. 23, 2007, Michael Livshiz.

U.S. Appl. No. 11/685,735, filed Mar. 13, 2007. Michael Livshiz.

U.S. Appl. No. 12/019,921, filed Jan. 25, 2008, Michael Livshiz.

* cited by examiner

ECM SECURITY STRATEGY FOR RATIONALIZING AND CONTROLLING INCREASING TRANSMISSION TORQUE REQUESTS ABOVE DRIVER COMMAND

CROSS-REFERENCE TO RELATED APPLICATIONS

This application claims the benefit of U.S. Provisional Application No. 61/036,576, filed on Mar. 14, 2008. The disclosure of the above application is incorporated herein by reference.

FIELD

The present disclosure relates to engine torque control, and more particularly to engine torque control of engine torque requests that are greater than driver torque requests.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired torque. Other vehicle systems, such as a transmission control system, may request that the engine produce torque in excess of torque requested by a driver of the vehicle. For example, the excess torque may be used to eliminate dragging of a wheel of the vehicle, increase vehicle traction, increase vehicle stability, smooth a gear shift, and/or for any other suitable purpose.

SUMMARY

A control module includes a predicted torque control module that determines a desired throttle area based on a transmission torque request and a desired predicted torque request. A throttle security module determines a throttle limit based on the desired throttle area and the desired predicted torque request and determines an adjusted desired throttle area based on the throttle limit. A throttle actuator module adjusts a throttle based on the adjusted desired throttle area.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
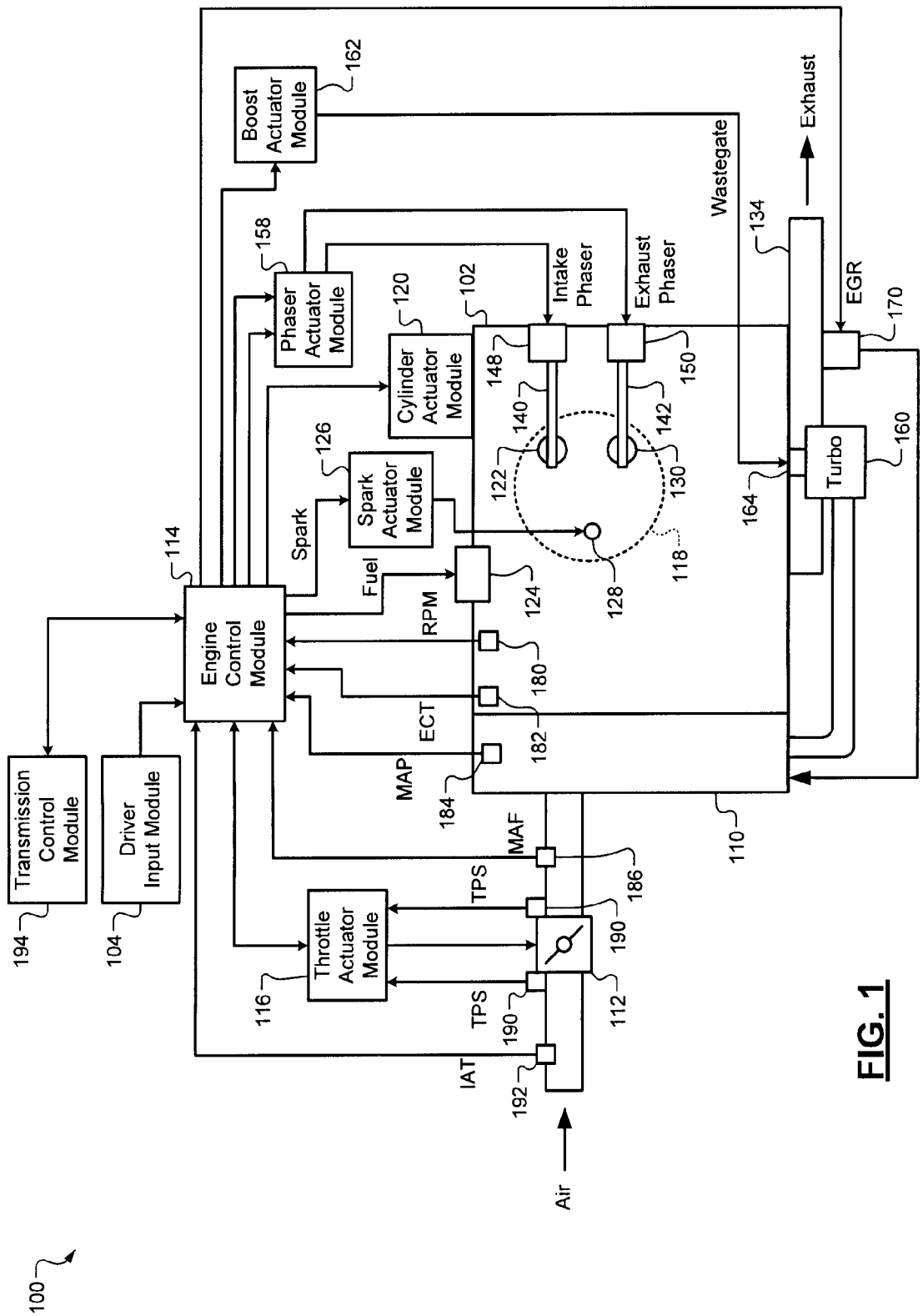
FIG. 1 is a functional block diagram of an exemplary implementation of an engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary implementation of an engine system 100 is presented. The engine system 100 includes an engine 102 that combusts an air/fuel mixture to produce drive torque for a vehicle based on a driver input module 104. While a spark ignition, gasoline-type engine is described herein, the present disclosure is applicable to other types of torque producers, not limited to gasoline-type engines, diesel-type engines, propane engines, and hybrid-type engines implementing one or more electric motors. The driver input module 104 receives the driver inputs from, for example, a pedal position sensor (not shown) that monitors position of an accelerator pedal (not shown) and generates a pedal position signal accordingly.

Air is drawn into an intake manifold 110 through a throttle valve 112. An engine control module (ECM) 114 commands a throttle actuator module 116 to regulate opening of the throttle valve 112 to control the amount of air drawn into the intake manifold 110. Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders to improve fuel economy.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark delivery may be specified relative to the time when the piston is at its topmost position, referred to as top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control the exhaust valves of multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The air used to produce the compressed air charge may be taken from the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100. The ECM 114 may communicate with a transmission control module (TCM) 194 to coordinate shifting gears in a transmission (not shown). For example, the ECM 114 may reduce torque during a gear shift.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is an amount of a spark advance. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

To improve shift performance of the transmission, the ECM 114 secures a torque request of the transmission that is greater than a torque request by the driver. In addition, the ECM 114 secures the resulting desired area of the throttle valve 112. Securing the torque request of the transmission and the desired area of the throttle valve 112 on the ECM 114 avoids the more frequent hardware failures of the TCM 194 and utilizes the robustness of the torque control system of the ECM 114.

Figure 2:
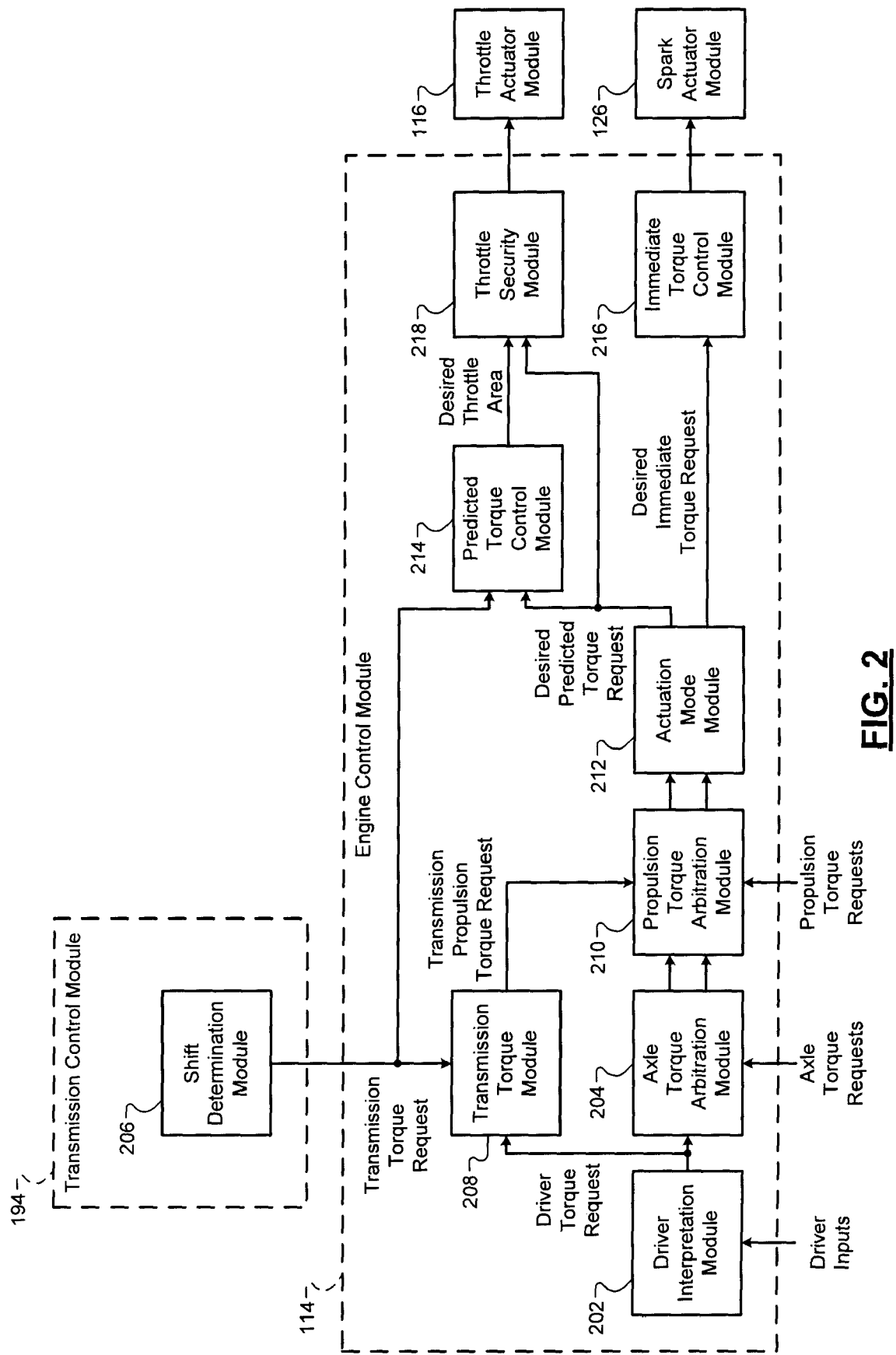
FIG. 2 is a functional block diagram of an exemplary implementation of a transmission control module and an engine control module according to the principles of the present disclosure.

Referring now to FIG. 2, the ECM 114 includes a driver interpretation module 202. The driver interpretation module 202 receives driver inputs from the driver input module 104. For example, the driver inputs may include an accelerator pedal position. The driver interpretation module 202 outputs a driver torque request.

The ECM 114 includes an axle torque arbitration module 204. The axle torque arbitration module 204 arbitrates between the driver torque request from the driver interpretation module 202 and other axle torque requests. For example, other axle torque requests may include torque reductions requested during wheel slip by a traction control system (not shown) and torque requests to control speed from a cruise control system (not shown).

The axle torque arbitration module 204 outputs a predicted torque request and an immediate torque request. The predicted torque request is the amount of torque that should be ready in the future to meet the driver's torque and/or speed requests. The immediate torque request is the torque required at the present moment to meet temporary torque requests such as torque reductions when shifting gears or when traction control senses wheel slippage. The ECM 114 may achieve the immediate torque request using engine actuators that respond quickly, while slower engine actuators are used to achieve the predicted torque request. For example, a spark actuator may be able to quickly change the spark advance, while cam phaser or throttle actuators may be slower to respond.

The TCM 194 includes a shift determination module 206 that determines a transmission torque request when the driver requests a downshift of the transmission. The downshift may indicate that engine braking is desired. The shift determination module 206 outputs the transmission torque request to the ECM 114 to expedite the downshift by increasing the RPM via an engine torque request based on the transmission torque request.

The ECM 114 includes a transmission torque module 208 that receives the transmission torque request and the driver torque request. The transmission torque module 208 determines whether the transmission torque request is greater than the driver torque request. If the transmission torque request is greater than the driver torque request, the transmission torque module 208 diagnoses the message of the transmission torque via several tests on the message.

If the message of the transmission torque request is valid, the transmission torque module 208 checks a random access memory (RAM) (not shown) of the ECM 114 for hardware failures (i.e., runs a RAM check). If the RAM is free of hardware errors, the transmission torque module 208 determines an engine torque request (i.e., a transmission propulsion torque request) based on the transmission torque request. For example only, the transmission propulsion torque request may be determined based on a model that relates the transmission propulsion torque request to the transmission torque request. If the message of the transmission torque request is invalid or the RAM has hardware errors, the transmission torque module 208 ceases control and does not determine the transmission propulsion torque request.

A propulsion torque arbitration module 210 arbitrates between torque requests from the axle torque arbitration module 204, the transmission torque module 208, and other propulsion torque requests. Other propulsion torque requests may include, for example, torque reductions for engine overspeed protection and torque increases for stall prevention. If the propulsion torque arbitration module 210 receives an increasing transmission propulsion torque request from the transmission torque module 208, the engine 102 cannot produce a torque lower than the transmission propulsion torque request. In other words, the transmission propulsion torque is the minimum torque the engine 102 can produce.

An actuation mode module 212 receives the predicted torque and immediate torque requests from the propulsion torque arbitration module 210. Based upon a mode setting, the actuation mode module 212 determines how the predicted requested torque and the immediate requested torque will be achieved. The actuation mode module 212 then outputs desired predicted torque request and desired immediate torque request values to a predicted torque control module 214 and an immediate torque control module 216, respectively.

The immediate torque control module 216 may control engine parameters that change relatively more quickly than engine parameters controlled by the predicted torque control module 214. For example, the predicted torque control module 214 may control throttle position, which may move from one position to another over many cylinder firings. For example, the immediate torque control module 216 may control spark advance, which may reach a commanded value by the time the next cylinder fires.

In a first mode of operation, the actuation mode module 212 may pass the requested predicted torque request unchanged to the predicted torque control module 214. The actuation mode module 212 may instruct the immediate torque control module 216 to set the spark advance to a calibration value that achieves the maximum possible torque. In this first mode of operation, the immediate torque request is ignored by the predicted torque control module 214 and by the immediate torque control module 216.

In a second mode of operation, the actuation mode module 212 may also pass the requested predicted torque request to the predicted torque control module 214. However, in this second mode, the actuation mode module 212 may instruct the immediate torque control module 216 to attempt to achieve the immediate torque request, such as by retarding the spark advance.

In a third mode of operation, the actuation mode module 212 may instruct the cylinder actuator module 120 to deactivate cylinders (not shown) if necessary to achieve the requested immediate torque request. In addition, the predicted torque request is output to the predicted torque control module 214 and the immediate torque request is output to the immediate torque control module 216.

In a fourth mode of operation, the actuation mode module 212 outputs a reduced torque request to the predicted torque control module 214. The predicted torque request may be reduced only so far as is necessary to allow the immediate torque control module 216 to achieve the immediate torque request using spark retard.

The predicted torque control module 214 attempts to achieve a desired predicted torque request using associated actuators. For example, the predicted torque control module 214 may output a commanded throttle area to a throttle actuator module 116. The commanded throttle area represents the area that will allow the engine to reach the desired predicted torque request. The immediate torque control module 216 attempts to achieve the desired immediate torque request using associated actuators. For example, the immediate torque control module 216 may output a desired spark advance to the spark actuator module 126.

The predicted torque control module 214 receives the desired predicted torque request and the transmission torque request. The predicted torque control module 214 determines whether conditions exist that indicate that the transmission torque request is enabled, or was properly determined. For example only, the conditions may include, but are not limited to, the driver requesting the downshift. The downshift may be indicated by the message of the transmission torque request, for example. If one of the conditions does not exist, the predicted torque control module 214 ceases control and does not determine the desired throttle area.

If all of the conditions exist that indicate that the transmission torque request above driver torque request is enabled, the predicted torque control module 214 determines whether abort conditions exist that may impact the proper operation of the predicted torque control module 214. For example only, the abort conditions may include, but are not limited to, the accelerator pedal position being greater than a predetermined value, the ECT being less than a predetermined value, and a vehicle speed not within a predetermined range. If one of the abort conditions exists, the predicted torque control module 214 ceases control and does not determined the desired throttle area.

If no abort conditions exist, the predicted torque control module 214 determines whether the transmission torque request has been active for longer than a predetermined period (i.e., runs a validity check). If the transmission torque request has been active for longer than the predetermined period, the predicted torque control module 214 ceases control and does not determine the desired throttle area. If the transmission torque request has not been active for longer than the predetermined period, the predicted torque control module 214 determines a torque limit based on an engine gear and the vehicle speed. The engine gear is determined by an engine gear determination module (not shown), and the vehicle speed is determined by a vehicle speed determination module (not shown). For example only, the torque limit may be determined based on a function that relates the torque limit to the engine gear and the vehicle speed.

The torque limit is a torque value and is an upper limit on the desired predicted torque request. In other words, the desired predicted torque request cannot exceed the torque limit. The predicted torque control module 214 applies the torque limit to the desired predicted torque request. The predicted torque control module 214 determines the desired throttle area based on the desired predicted torque request, as limited, the MAF from the MAF sensor 186, the RPM from the RPM sensor 180, and the MAP from the MAP sensor 184. Further discussion of the determination of the desired throttle area may be found in commonly assigned patent application Ser. No. 12/019,921, filed Jan. 25, 2008, and entitled "RPM to Torque Transition Control," the disclosure of which is incorporated herein by reference in its entirety.

Before the desired throttle area is outputted to the throttle actuator module 116, a throttle security module 218 receives the desired throttle area and the desired predicted torque request. The throttle security module 218 determines whether the transmission torque request is active. For example only, the transmission torque request may be active when the transmission torque request wins arbitration in the propulsion torque arbitration module 210. This may be indicated by the message of the desired predicted torque request, for example. If the transmission torque request is inactive, the throttle security module 218 ceases control and does not output the desired throttle area.

If the transmission torque request is active, the throttle security module 218 determines a throttle limit based on the engine gear or a transmission gear that is determined by a transmission gear determination module (not shown). For example only, the throttle limit may be determined based on a function that relates the throttle limit to the lowest of the engine gear and the transmission gear. The throttle limit is a throttle area value and is a lower limit on the desired throttle area. In other words, the desired throttle area must exceed the throttle limit. If the desired throttle area does not exceed the throttle limit, the throttle security module 218 ceases control and does not output the desired throttle area.

If the desired throttle area does exceed the throttle limit, the throttle security module 218 determines whether the transmission torque request has been active for longer than a predetermined period (i.e., runs a validity check). If the transmission torque request has been active for longer than the predetermined period, the throttle security module 218 ceases control and does not determine the desired throttle area. If the transmission torque request has not been active for longer than the predetermined period, the throttle security module 218 determines an input and output transmission speed. For example only, the output transmission speed may be determined based on a model that relates the output transmission speed to the transmission output speed sensor (TOS) location.

The throttle security module 218 determines a transmission speed ratio based on a current input transmission speed and the output transmission speed. The transmission speeds are determined by a transmission speed determination module (not shown). The throttle security module 218 determines whether the transmission speed ratio is changing since the previous calculation. If the transmission speed ratio is not changing since the previous calculation, the throttle security module 218 ceases control and does not output the desired throttle area.

If the transmission speed ratio is changing since the previous calculation, the throttle security module 218 determines an output engine speed based on the commanded gear. For example only, the output engine speed may be determined based on a model that relates the output engine speed to the commanded gear. The throttle security module 218 determines an engine flare (i.e., an increased value of engine speed) based on subtracting the RPM from the output engine speed. If the engine flare is less than a predetermined value, the throttle security module 218 ceases control and does not output the desired throttle area. For example only, the predetermined value may be determined based on the engine gear.

If the engine flare is greater than the predetermined value, the throttle security module 218 determines that the desired throttle area should not be limited. The throttle security module outputs the commanded throttle area when all tests are successful. If the throttle security module 218 determines a fault exist it ceases control and does not output the desired throttle area. If the desired throttle area is not faulted, the throttle security module 218 outputs the desired throttle area to the throttle actuator module 116.

Figure 3:
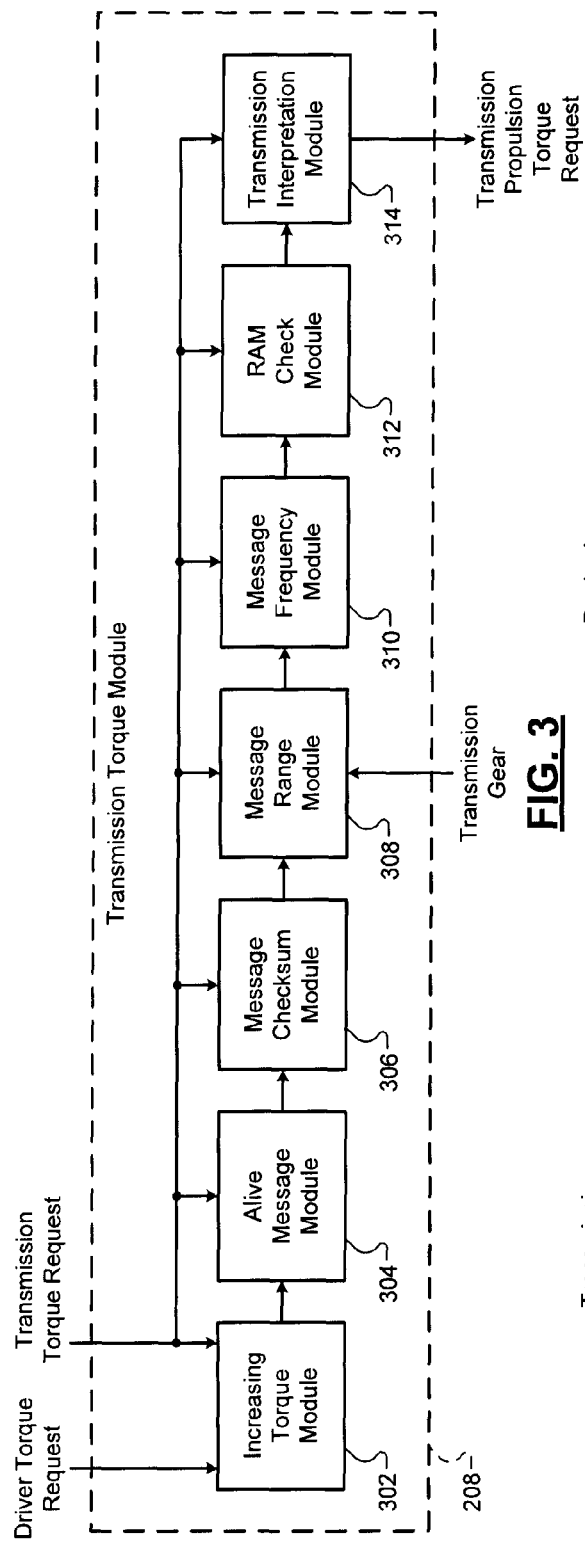
FIG. 3 is a functional block diagram of an exemplary implementation of a transmission torque module according to the principles of the present disclosure.

Referring now to FIG. 3, a functional block diagram of an exemplary implementation of the transmission torque module 208 is presented. The transmission torque module 208 includes an increasing torque module 302, an alive message module 304, a message checksum module 306, a message range module 308, and a message frequency module 310. The transmission torque module 208 further includes a RAM check module 312 and a transmission interpretation module 314.

The increasing torque module 302 receives the driver torque and the transmission torque requests. The increasing torque module 302 generates an indication that torque is increasing when the transmission torque request is greater than the driver torque request. If the transmission torque request is present, the increasing torque module 302 enables the alive message module 304.

The alive message module 304 receives the transmission torque request message and runs an alive message test based on the transmission torque request. The alive message test determines whether the message of the transmission torque request is alive, or not the same in value for a number of messages. The number of messages may be predetermined. For example only, the alive message test may be implemented by storing the transmission torque request and comparing the stored transmission torque request with the next transmission torque request message. If the message is not alive, the alive message module 304 ceases control and may output a fault signal (not shown).

If the message of the transmission torque request is alive, the alive message module 304 enables the message checksum module 306. The message checksum receives the transmission torque request and runs a checksum based on the transmission torque request. The checksum determines whether the message of the transmission torque request is corrupt. For example only, the checksum may be implemented by summing the bits of the message, storing the sum, summing the bits of the message again, and comparing the current sum to the stored sum. If the current sum and the store sum are not the same, the message is corrupt.

If the message of the transmission torque is corrupt, the message checksum module 306 ceases control and may output a fault signal (now shown). If the message of the transmission torque is not corrupt, the message checksum module 306 enables the message range module 308. The message range module 308 receives the transmission torque request and the transmission gear. The message range module 308 determines a range of transmission torque values based on the transmission gear. The message range module 308 determines whether the transmission torque is within the range.

If the transmission torque is not within the range, the message range module 308 ceases control and may output a fault signal (not shown). If the transmission torque is within the range of torque values, the message range module 308 enables the message frequency module 310. The message frequency module 310 receives the transmission torque and runs a message frequency test based on the transmission torque request. The message frequency test determines whether the transmission torque request is changing in a predictable pattern. The predictable pattern may be predetermined. For example only, the predictable pattern may be the transmission torque request is changing from a maximum limit of 500 Nm to a minimum limit of 0 Nm, three times in one second.

If the transmission torque request is diagnosed as changing in the predictable pattern, the message frequency module 310 ceases control and may output a fault signal (not shown). If the transmission torque request is not changing in the predictable pattern, the message frequency module 310 enables the RAM check module 312. The RAM check module 312 receives the transmission torque request and runs a RAM check. When determined, the transmission torque request is stored in two locations of the RAM. The RAM check determines whether the transmission torque stored in one location equals the transmission torque stored in the other location.

If the transmission torque requests in the two locations of the RAM equal each other, the RAM passes the RAM check. If the transmission torque requests in the two locations do not equal each other, the RAM fails the RAM check. If the RAM fails the RAM check, the RAM check module 312 ceases control and may output a fault signal that indicates hardware failures in the RAM. If the RAM passes the RAM check, the RAM check module 312 stores the transmission torque request in the two locations and enables the transmission interpretation module 314. The transmission interpretation module 314 receives the transmission torque request and determines the transmission propulsion torque request based on the transmission torque request.

Figure 4:
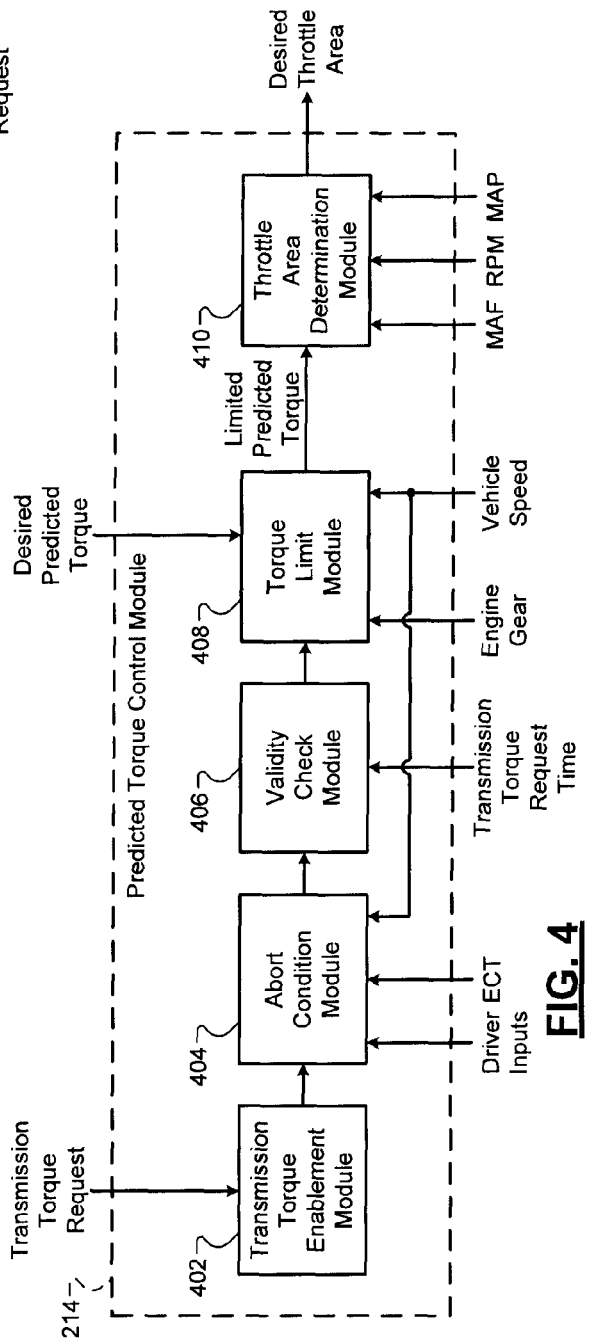
FIG. 4 is a functional block diagram of an exemplary implementation of a predicted torque control module according to the principles of the present disclosure.

Referring now to FIG. 4, a functional block diagram of an exemplary implementation of the predicted torque control module 214 is shown. The predicted torque control module 214 includes a transmission torque enablement module 402, an abort condition module 404, a validity check module 406, a torque limit module 408, and a throttle area determination module 410. The transmission torque enablement module 402 may receive the transmission torque request and determines whether the conditions exist that indicate that the transmission torque request is enabled. The transmission torque enablement module 402 may determine whether the conditions exist based on the message of the transmission torque request. If one of the conditions does not exist, the transmission torque enablement module 402 ceases control and may output a fault signal (not shown).

If all of the conditions exist, the transmission torque enablement module 402 enables the abort condition module 404. The abort conditions module 404 may receive the driver inputs, the ECT from the ECT sensor 182, and the vehicle speed. The abort conditions module 404 determines whether the abort conditions exist and may determine whether the abort conditions exist based on the driver inputs, the ECT, and the vehicle speed. If one of the abort conditions exists, the abort conditions module 404 ceases control and may output a fault signal (not shown). If no abort conditions exist, the abort conditions module 404 enables the validity check module 406.

The validity check module 406 receives a transmission torque request time from a timing module (not shown). The timing module may include a timer that starts to increment when the transmission torque request is determined to be increasing. The timing module may determine the transmission torque request time based on the timer. The validity check module 406 determines whether the transmission torque request time is less than or equal to a predetermined period. If the transmission torque request time is greater than the predetermined period, the validity check module 406 ceases control and may output a fault signal (not shown).

If the transmission torque request time is less than or equal to the predetermined period, the validity check module 406 enables the torque limit module 408. The torque limit module 408 receives the desired predicted torque request, the engine gear, and the vehicle speed and determines the torque limit based on the engine gear and the vehicle speed. The torque limit module 408 determines whether the desired predicted torque request is less than or equal to the torque limit. If the desired predicted torque request is less than or equal to the torque limit, the torque limit module 408 sets a limited predicted torque to the desired predicted torque request. If the desired predicted torque request is greater than the torque limit, the torque limit module 408 sets the limited predicted torque to the torque limit.

The throttle area determination module 410 receives the limited predicted torque, the MAF, the RPM, and the MAP. The throttle area determination module 410 determines the desired throttle area based on the limited predicted torque, the MAF, the RPM, and the MAP. The throttle area determination module 410 outputs the desired throttle area to the throttle security module 218.

Figure 5:
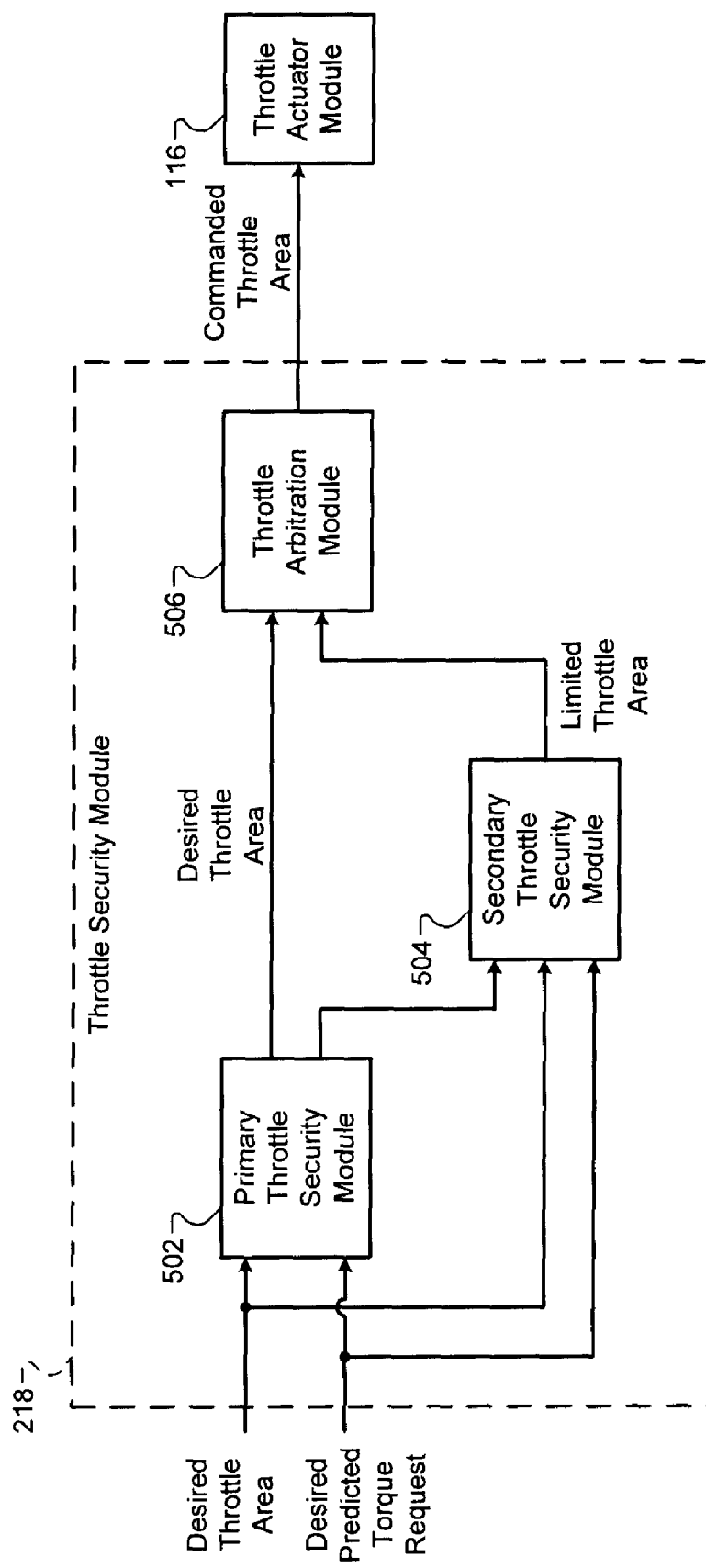
FIG. 5 is a functional block diagram of an exemplary implementation of a throttle security module according to the principles of the present disclosure.

Referring now to FIG. 5, a functional block diagram of an exemplary implementation of the throttle security module 218 is shown. The throttle security module 218 may be located within the ECM 114 or at other locations, such as within the throttle actuator module 116, for example. The throttle security module 218 includes a primary throttle security module 502, a secondary throttle security module 504, and a throttle arbitration module 506.

The primary throttle security module 502 receives the desired throttle area, commanded gear, and the desired predicted torque request. The primary throttle security module 502 runs several tests to determine whether the desired throttle area is secure in value. If none of the tests result in a fault, the primary throttle security module outputs the desired throttle area to the throttle arbitration module 506. If one of the tests results in a fault, the primary throttle security module 502 enables the secondary throttle security module 504.

The secondary throttle security module 504 may be located within the throttle security module 218 or at other locations, such as within another processor of the engine system 100, for example. The secondary throttle security module 504 receives the desired throttle area and the desired predicted torque request. The secondary throttle security module 504 runs a couple tests to determine whether the desired throttle area is secure in value. If one of the tests results in a fault, the secondary throttle security module 504 ceases control and may output a fault signal (not shown). If none of the tests result in a fault, the secondary throttle security module 504 determines the throttle limit based on the engine gear and the transmission gear.

The secondary throttle security module 504 determines a secondary throttle limit based on the sum of the throttle limit and a predetermined throttle area value. The secondary throttle limit is a throttle area value and is a upper limit on the desired throttle area. In other words, the desired throttle area will be limited to the secondary throttle limit. The predetermined throttle area value is the additional throttle area value above the throttle limit that may be commanded without startling the driver. The secondary throttle security module 504 applies the secondary throttle limit to the desired throttle area to determine a limited throttle area.

The throttle arbitration module 506 receives the desired throttle area or the limited throttle area. If the throttle arbitration module 506 receives the desired throttle area, the throttle arbitration module 506 determines a commanded throttle area based on the desired throttle area. If the throttle arbitration module 506 receives the limited throttle area, the throttle arbitration module 506 determines the commanded throttle area based on the limited throttle area. The throttle arbitration module 506 outputs the commanded throttle area to the throttle actuator module 116.

Figure 6:
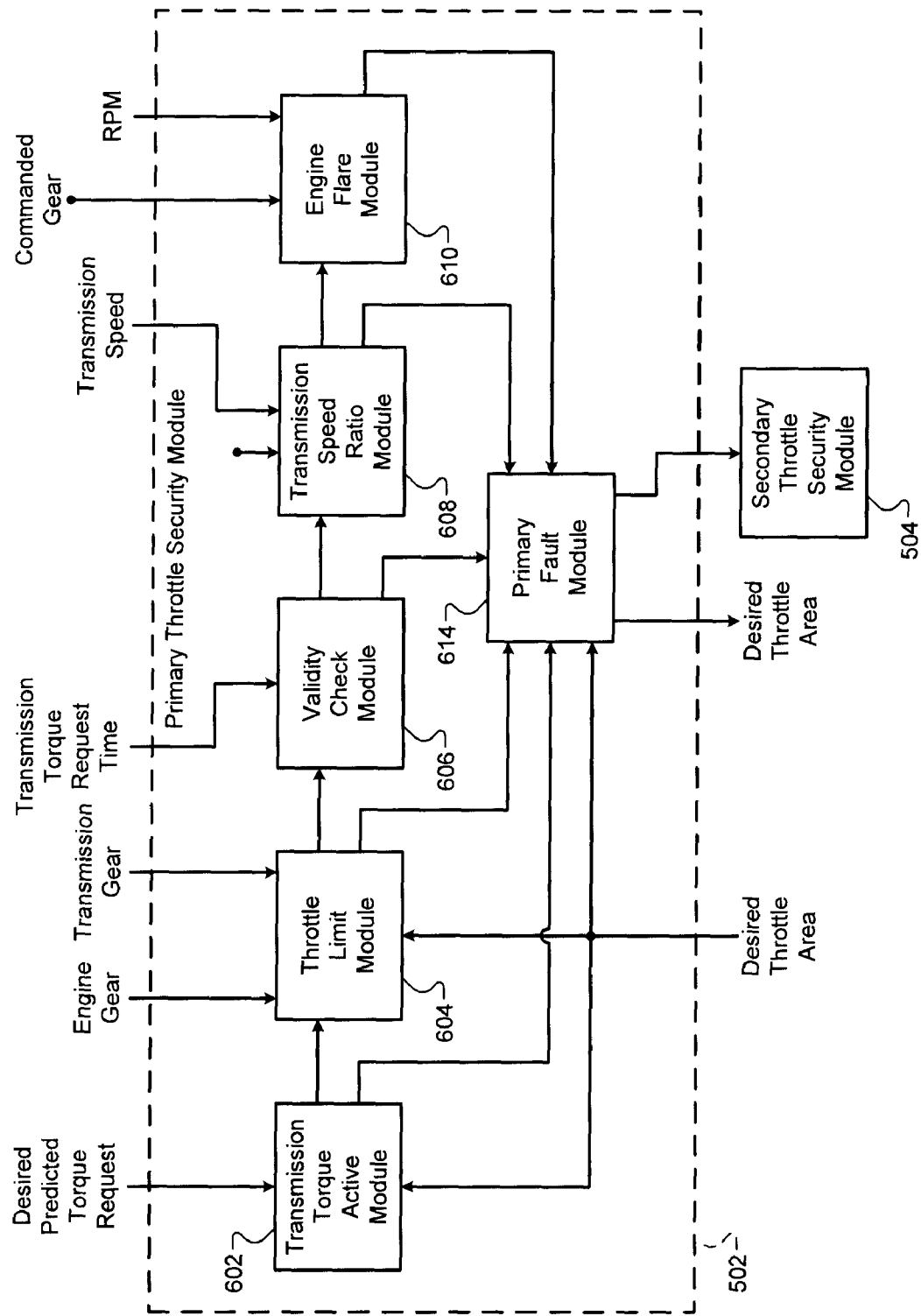
FIG. 6 is a functional block diagram of an exemplary implementation of a primary throttle security module according to the principles of the present disclosure.

Referring now to FIG. 6, a functional block diagram of a primary throttle security module 502 is shown. The primary throttle security module 502 includes a transmission torque active module 602, a throttle limit module 604, a validity check module 606, and a transmission speed ratio module 608. The primary throttle security module 502 further includes an engine flare module 610, a throttle closed module 612, and a primary fault module 614.

The transmission torque active module 602 receives the desired predicted torque request and runs a transmission torque active test. The transmission torque active test determines whether the transmission torque request is increasing and may be based on the desired predicted torque request. If the transmission torque request is inactive (not increasing), the transmission torque active module 602 ceases control and outputs a fault signal to the primary fault module 614. If the transmission torque is increasing, the transmission torque enables the throttle limit module 604.

The throttle limit module 604 receives the desired throttle area, the engine gear, and the transmission gear and determines the throttle limit based on the engine gear and the transmission gear. The throttle limit module 604 determines whether the desired throttle area is greater than the throttle limit. If the desired throttle area is less than or equal to the throttle limit, the throttle limit module 604 ceases control and outputs a fault signal to the primary fault module 614. If the desired throttle area is greater than the throttle limit, the throttle limit module 604 enables the validity check module 606.

The validity check module 606 receives the transmission torque request time and determines whether the transmission torque request time is less than or equal to a predetermined period. If the transmission torque request time is greater than the predetermined period, the validity check module 606 ceases control and outputs a fault signal to the primary fault module 614. If the transmission torque request time is less than or equal to the predetermined period, the validity check module 606 enables the transmission speed ratio module 608.

The transmission speed ratio module 608 receives the transmission speeds from the transmission speed determination module (not shown). The transmission speed ratio module 608 determines the transmission speed ratio based on the input transmission speed and the output transmission speed. The transmission speed ratio module 608 runs a ratio change test to determine whether the transmission speed ratio is changing. For example only, the ratio change test may be implemented by storing the transmission speed ratio and comparing the stored transmission speed ratio to the next transmission speed ratio of the next calculation. If the transmission speed ratio is not changing, the transmission speed ratio module 608 ceases control and outputs a fault signal to the primary fault module 614.

If the transmission speed is changing, the transmission speed ratio module 608 enables the engine flare module 610. The engine flare module 610 receives a commanded gear and the RPM and determines the output engine speed based on the commanded gear. The engine flare module 610 determines the engine flare based on the RPM and the output engine speed. The engine flare module 610 determines whether the engine flare is greater than a predetermined value. If the engine flare is less than or equal to the predetermined value, the engine flare module 610 ceases control and outputs a fault signal to the primary fault module 614.

If the engine flare is greater than the predetermined value, the engine flare module outputs the desired throttle area to the primary fault module 614.

If the primary fault module 614 does not receive a fault signal from any of the modules of the primary throttle security module 502, the primary fault module 614 outputs the desired throttle area. If the primary fault module 614 receives a fault signal from one of the modules of the primary throttle security module 502, the primary fault module 614 enables the secondary throttle security module 504.

Figure 7:
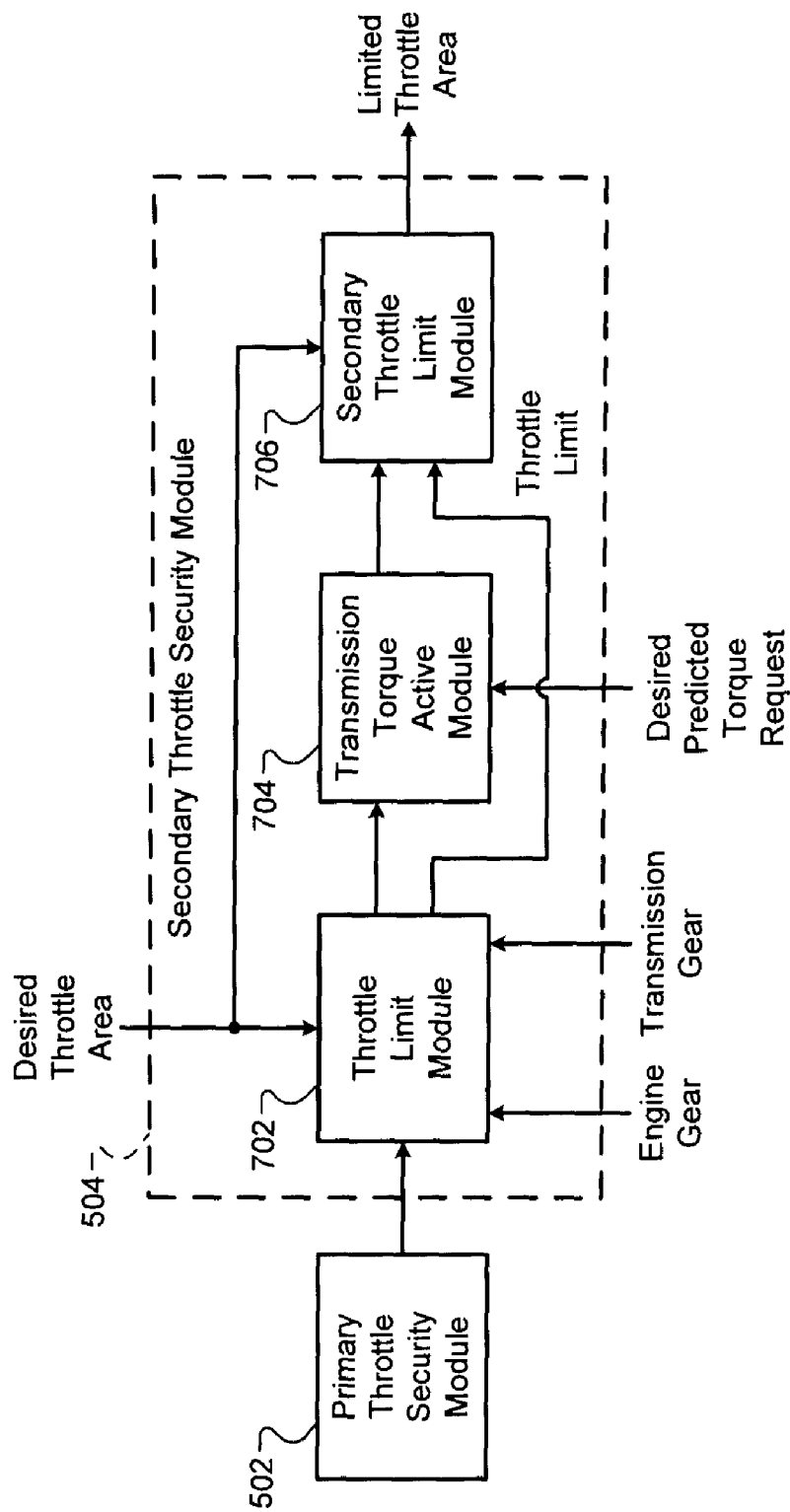
FIG. 7 is a functional block diagram of an exemplary implementation of a secondary throttle security module according to the principles of the present disclosure.

Referring now to FIG. 7, a functional block diagram of an exemplary implementation of the secondary throttle security module 504 is shown. The secondary throttle security module 504 includes a throttle limit module 702, a transmission torque active module 704, and a secondary throttle limit module 706. If the primary throttle security module 502 detects a fault in securing the desired throttle area, the primary throttle security module 502 enables the throttle limit module 702.

The throttle limit module 702 receives the desired throttle area, the engine gear, and the transmission gear and determines the throttle limit based on the engine gear and the transmission gear. The throttle limit module 702 determines whether the desired throttle area is greater than the throttle limit. If the desired throttle area is less than or equal to the throttle limit, the throttle limit module 702 ceases control and may output a fault signal (not shown). If the desired throttle area is greater than the throttle limit, the throttle limit module 702 enables the transmission torque active module 704.

The transmission torque active module 704 receives the desired predicted torque request and runs the transmission torque active test that may be based on the desired predicted torque request. If the transmission torque request is inactive, the transmission torque active module 602 ceases control and may output a fault signal (not shown). If the transmission torque request is increasing, the transmission torque enables the secondary throttle limit module 706.

The secondary throttle limit module 706 receives the desired throttle area and the throttle limit and determines the secondary throttle limit based on the throttle limit. If the desired throttle area is greater than the secondary throttle limit, the secondary throttle limit module 706 sets the desired throttle area to the limited throttle area. If the desired throttle area is less than or equal to the secondary throttle limit, the secondary throttle limit module 706 sets the limited throttle area to the secondary throttle limit.

Figure 8:
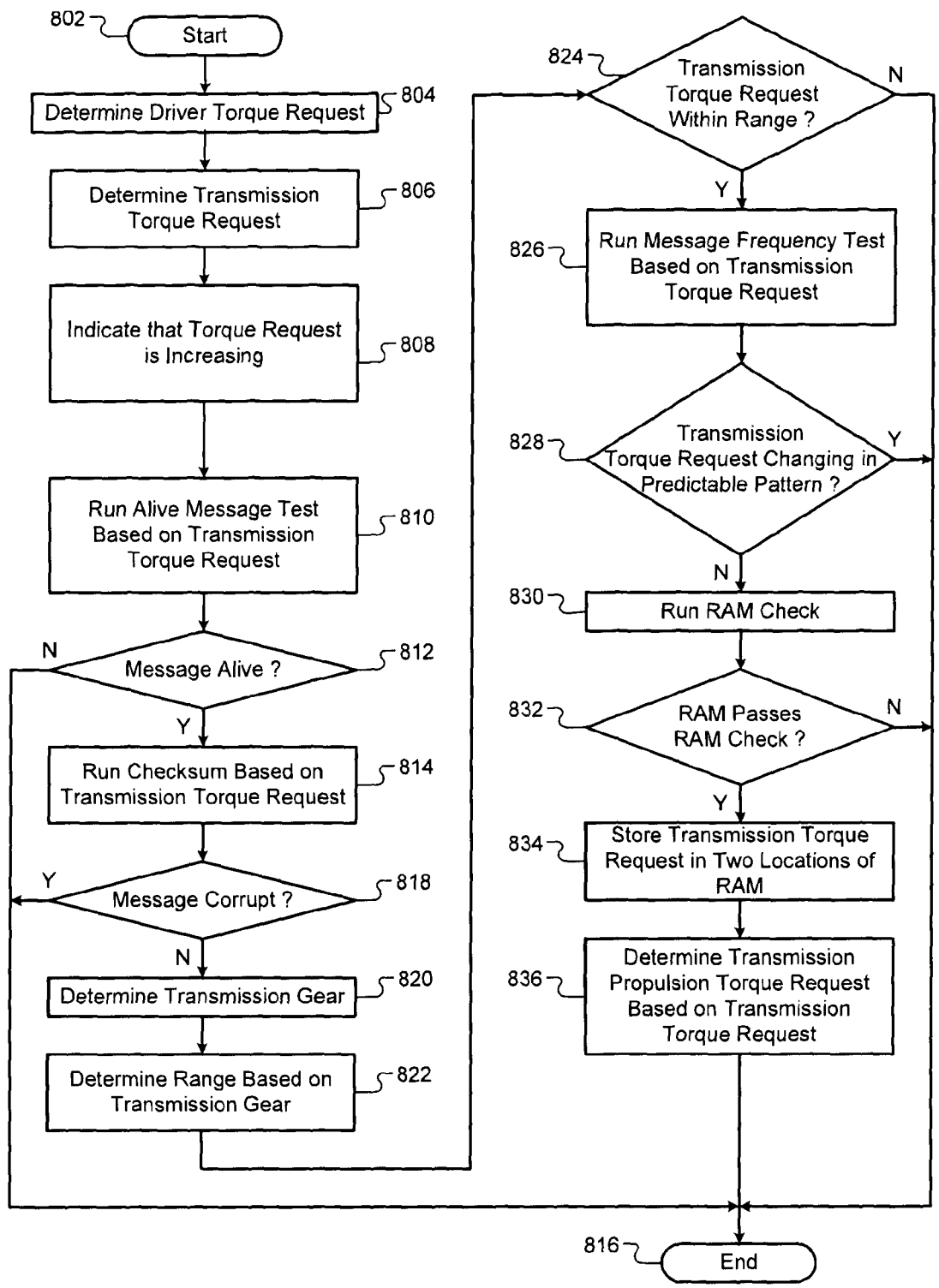
FIG. 8 is a flowchart depicting exemplary steps performed by the transmission torque module according to the principles of the present disclosure.

Referring now to FIG. 8, a flowchart depicting exemplary steps performed by the transmission torque module 208 is shown. Control begins in step 802. In step 804, the driver torque request is determined. In step 806, the transmission torque request is determined.

In step 808, control indicates that a transmission torque request is increasing. In step 810, the alive message test is run based on the transmission torque request.

In step 812, control determines whether the message of the transmission torque request is alive. If true, control continues in step 814. If false, control continues in step 816. In step 814, the checksum is run based on the transmission torque request.

In step 818, control determines whether the message of the transmission torque request is corrupt. If false, control continues in step 820. If true, control continues in step 816. In step 820, the transmission gear is determined. In step 822, the range of transmission torque values is determined based on the transmission gear.

In step 824, control determines whether the transmission torque request is within the range. If true, control continues in step 826. If false, control continues in step 816. In step 826, the message frequency test is run based on the transmission torque request.

In step 828, control determines whether the transmission torque request is changing in the predictable pattern. If false, control continues in step 830. If true, control continues in step 816. In step 830, the RAM check is run. In step 832, control determines whether the RAM passes the RAM check. If true, control continues in step 834. If false, control continues in step 816.

In step 834, the transmission torque request is store in two locations of the RAM. In step 836, the transmission propulsion torque is determined based on the transmission torque. Control ends in step 816.

Figure 9:
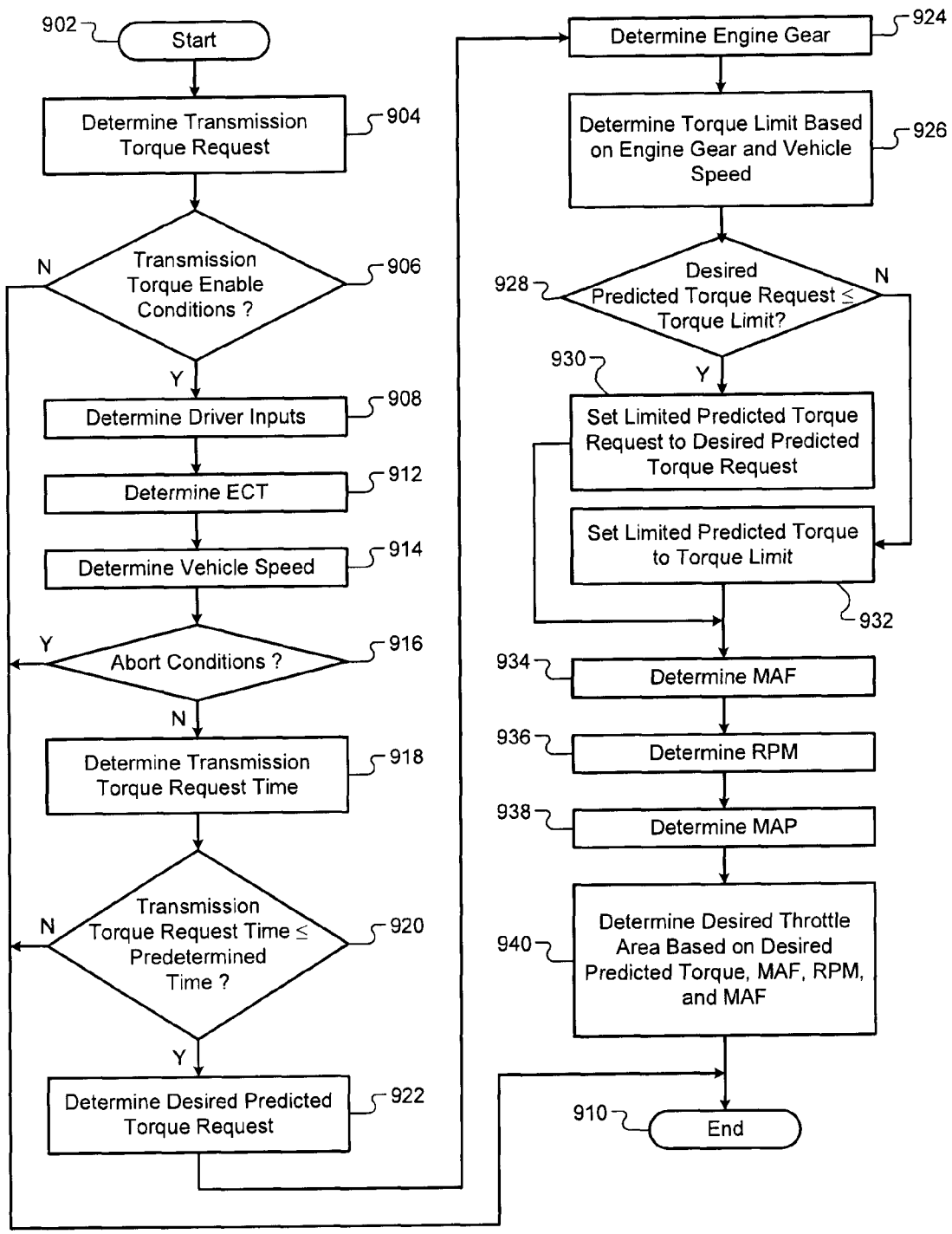
FIG. 9 is a flowchart depicting exemplary steps performed by the predicted torque control module according to the principles of the present disclosure.

Referring now to FIG. 9, a flowchart depicting exemplary steps performed by the predicted torque control module 214 is shown. Control begins in step 902. In step 904, the transmission torque request is determined. In step 906, control determines whether transmission torque enable conditions exist based on the message of the transmission torque request. If true, control continues in step 908. If false, control continues in step 910.

In step 908, the driver inputs are determined. In step 912, the ECT is determined. In step 914, the vehicle speed is determined. In step 916, control determines whether abort conditions exist based on the driver inputs, the ECT, and the vehicle speed. If false, control continues in step 918. If true, control continues in step 910.

In step 918, the transmission torque request time is determined. In step 920, control determines whether the transmission torque request time is less than or equal to a predetermined period. If true, control continues in step 922. If false, control continues in step 910.

In step 922, the desired predicted torque request is determined. In step 924, the engine gear is determined. In step 926, the torque limit is determined based on the engine gear and the vehicle speed. In step 928, control determines whether the desired predicted torque request is less than or equal to the torque limit. If true, control continues in step 930. If false, control continues in step 932.

In step 930, the limited predicted torque is set to the desired predicted torque request. In step 932, the limited predicted torque is set to the torque limit. In step 934, the MAF is determined. In step 936, the RPM is determined. In step 938, the MAP is determined.

In step 940, the desired throttle area is determined based on the limited predicted torque, the MAF, the RPM, and the MAP. Control ends in step 910.

Figure 10A:
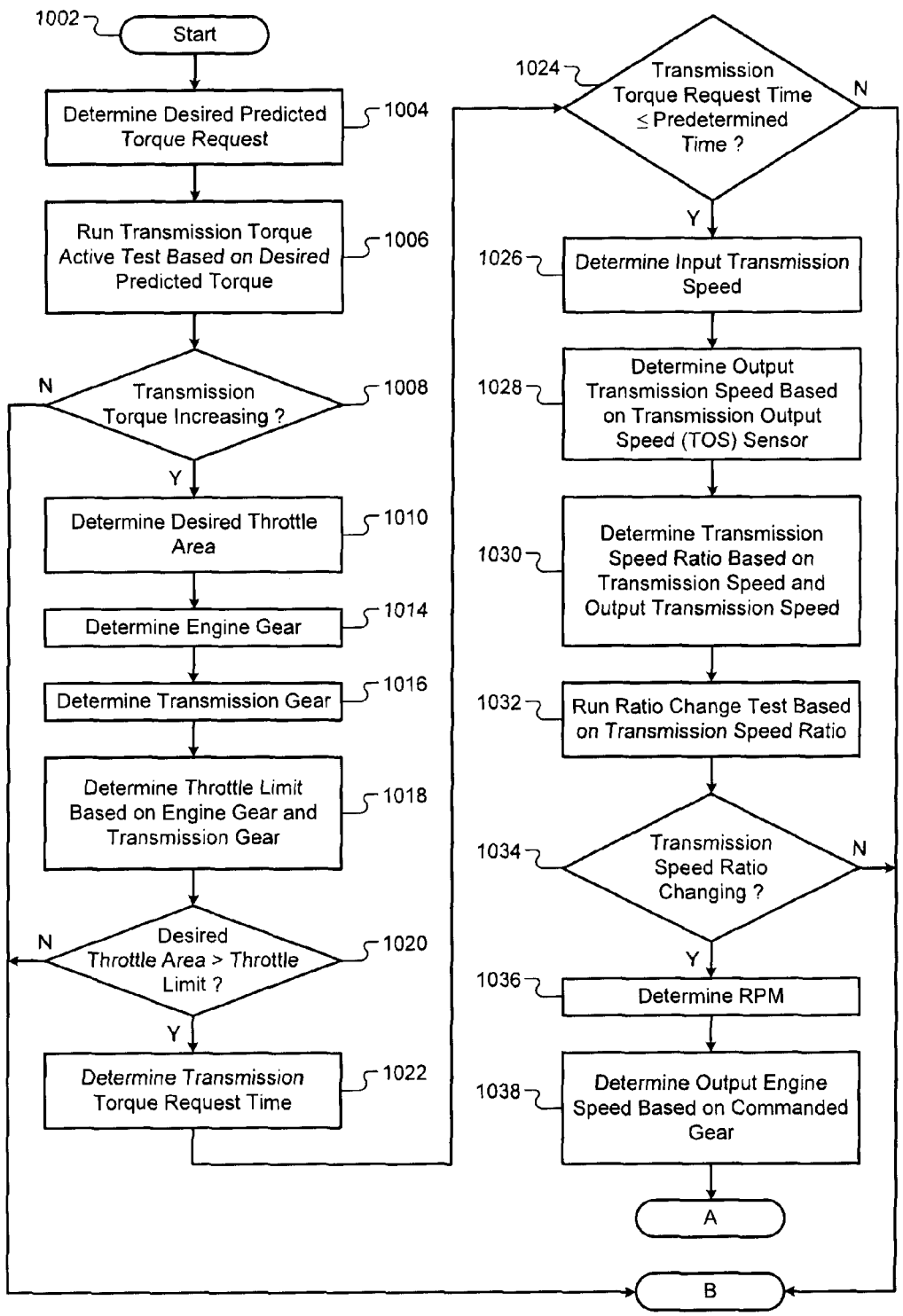
FIG. 10A is a flowchart depicting exemplary steps performed by the primary torque security module according to the principles of the present disclosure.
Figure 10B:
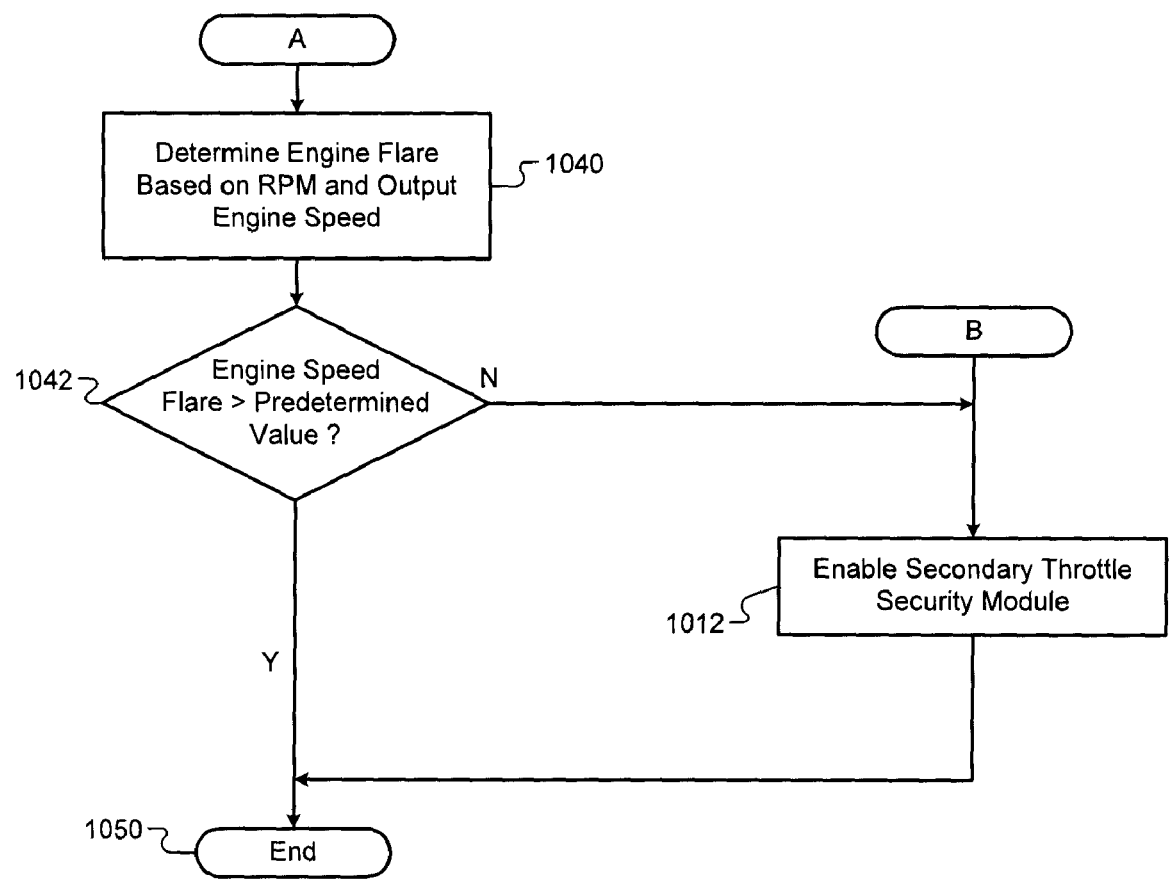
FIG. 10B is a portion of the flowchart of FIG. 10A.

Referring now to FIG. 10A and FIG. 10B, a flowchart depicting exemplary steps performed by the primary throttle security module 502 is shown. Control begins in step 1002. In step 1004, the desired predicted torque request is determined. In step 1006, the transmission torque active test is run based on the desired predicted torque request.

In step 1008, control determines whether the transmission torque request is increasing. If true, control continues in step 1010. If false, control continues in step 1012. In step 1010, the desired throttle area is determined. In step 1014, the engine gear is determined.

In step 1016, the transmission gear is determined. In step 1018, the throttle limit is determined based on the engine gear and the transmission gear. In step 1020, control determines whether the desired throttle area is greater than the throttle limit. If true, control continues in step 1022. If false, control continues in step 1012.

In step 1022, the transmission torque request time is determined. In step 1024, control determines whether the transmission torque request time is less than or equal to a predetermined period. If true, control continues in step 1026. If false, control continues in step 1012.

In step 1026, the input transmission speed is determined. In step 1028, the output transmission speed is determined based on the transmission output speed (TOS) sensor. In step 1030, the transmission speed ratio is determined based on the input transmission speed and the output transmission speed.

In step 1032, the ratio change test is run based on the transmission speed ratio. In step 1034, control determines whether the transmission speed ratio is changing. If true, control continues in step 1036. If false, control continues in step 1012.

In step 1036, the RPM is determined. In step 1038, the output engine speed is determined based on the commanded gear. In step 1040, the engine flare is determined based on the RPM and the output engine speed. In step 1042, control determines whether the engine flare is greater than a predetermined value. If true, control ends in step 1050. If false, control continues in step 1012. In step 1012, the secondary throttle security module 504 is enabled. Control ends in step 1050.

Figure 11:
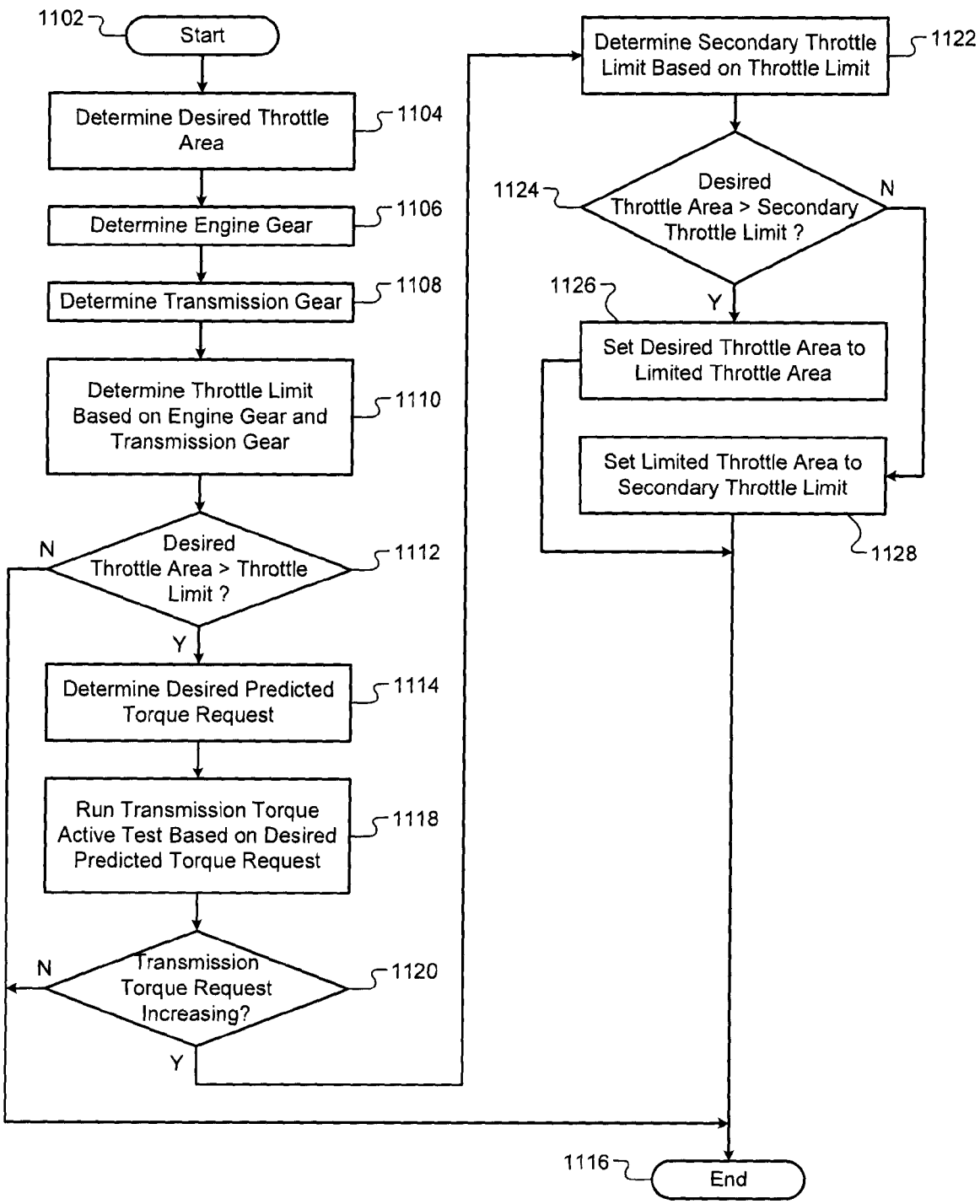
FIG. 11 is a flowchart depicting exemplary steps performed by the secondary torque security module according to the principles of the present disclosure.

Referring now to FIG. 11, a flowchart depicting exemplary steps performed by the secondary throttle security module 504 is shown. Control begins in step 1102. In step 1104, the desired throttle area is determined. In step 1106, the engine gear is determined.

In step 1108, the transmission gear is determined. In step 1110, the throttle limit is determined based on the engine gear and the transmission gear. In step 1112, control determines whether the desired throttle area is greater than the throttle limit. If true, control continues in step 1114. If false, control continues in step 1116.

In step 1114, the desired predicted torque request is determined. In step 1118, the transmission torque active test is run based on the desired predicted torque request. In step 1120, control determines whether the transmission torque request is increasing. If true, control continues in step 1122. If false, control continues in step 1116.

In step 1122, the secondary throttle limit is determined based on the throttle limit. In step 1124, control determines whether the desired throttle area is greater than the secondary throttle limit. If true, control continues in step 1126. If false, control continues in step 1128.

In step 1126, the desired throttle area is set to the limited throttle area. In step 1128, the limited throttle area is set to the secondary throttle limit. Control ends in step 1116.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control module comprising:
a predicted torque control module that determines a desired throttle area based on a transmission torque request and a desired predicted torque;
a throttle security module that determines a throttle limit based on the desired throttle area, the desired predicted torque, and whether the transmission torque request is greater than a driver torque request, and that determines an adjusted desired throttle area based on the throttle limit; and
a throttle actuator module that adjusts a throttle based on the adjusted desired throttle area.

2. The control module of claim 1 wherein the desired predicted torque indicates whether the transmission torque request is increasing and the throttle security module determines the throttle limit based on whether the transmission torque request is increasing.

3. The control module of claim 2 wherein the throttle security module does not determine the adjusted desired throttle area when the transmission torque request is not active.

4. The control module of claim 1 wherein the throttle security module determines the throttle limit further based on a selected gear and a vehicle speed.

5. The control module of claim 1 wherein the throttle security module determines a change in an output transmission speed based on the desired predicted torque and determines the adjusted desired throttle area further based on the change.

6. The control module of claim 1 wherein the throttle security module determines the adjusted desired throttle area further based on engine flare.

7. The control module of claim 1 wherein the throttle security module determines the adjusted desired throttle area further based on a throttle valve position.

8. The control module of claim 1 wherein the throttle security module includes:
a primary throttle security module that determines the adjusted desired throttle area;
a secondary throttle security module that determines a limited throttle area; and
a throttle arbitration module that determines a commanded throttle area based on the adjusted desired throttle area and the limited throttle area.

9. The control module of claim 8 wherein the primary throttle security module diagnoses a fault based on at least one of a state of the transmission torque request, the desired throttle area, an engine gear, a transmission gear, a transmission torque request time, a transmission speed ratio, engine flare, and a throttle valve position.

10. The control module of claim 9 wherein the secondary throttle security module determines the limited throttle area based on the desired predicted torque, the throttle limit, and a secondary throttle limit when the primary throttle security module diagnoses the fault.

11. A method comprising:
determining a desired throttle area based on a transmission torque request and a desired predicted torque;
determining a throttle limit based on the desired throttle area, the desired predicted torque, and whether the transmission torque request is greater than a driver torque request;
determining an adjusted desired throttle area based on the throttle limit; and
adjusting a throttle based on the adjusted desired throttle area.

12. The method of claim 11 wherein the desired predicted torque indicates whether the transmission torque request is increasing and further comprising determining the throttle limit based on whether the transmission torque request is increasing.

13. The method of claim 12 further comprising not determining the adjusted desired throttle area when the transmission torque request is not active.

14. The method of claim 11 further comprising determining the throttle limit further based on a selected gear and a vehicle speed.

15. The method of claim 11 further comprising:
determining a change in an output transmission speed based on the desired predicted torque; and
determining the adjusted desired throttle area further based on the change.

16. The method of claim 11 further comprising determining the adjusted desired throttle area further based on engine flare.

17. The method of claim 11 further comprising determining the adjusted desired throttle area further based on a throttle valve position.

18. The method of claim 11 further comprising:
determining a limited throttle area; and
determining a commanded throttle area based on the adjusted desired throttle area and the limited throttle area.

19. The method of claim 18 further comprising diagnosing a fault based on at least one of a state of the transmission torque request, the desired throttle area, an engine gear, a transmission gear, a transmission torque request time, a transmission speed ratio, engine flare, and a throttle valve position.

20. The method of claim 19 further comprising determining the limited throttle area based on the desired predicted torque, the throttle limit, and a secondary throttle limit when the fault is diagnosed.

* * * * *